(No Model.) 11 Sheets—Sheet 1.

C. BONJOUR.
HYDRAULIC APPARATUS FOR CONTROLLING FLUID PRESSURE MOTORS.

No. 519,168. Patented May 1, 1894.

WITNESSES:
George Baumann
S. C. Tanner

INVENTOR
Claude Bonjour
BY
Howson and Howson
his ATTORNEYS (No Model.) 11 Sheets—Sheet 2.
C. BONJOUR.
HYDRAULIC APPARATUS FOR CONTROLLING FLUID PRESSURE MOTORS.
No. 519,168. Patented May 1, 1894.

WITNESSES:
INVENTOR
BY
his ATTORNEYS (No Model.) 11 Sheets—Sheet 3.

C. BONJOUR.
HYDRAULIC APPARATUS FOR CONTROLLING FLUID PRESSURE MOTORS.

No. 519,168. Patented May 1, 1894.

(No Model.) 11 Sheets—Sheet 4.
C. BONJOUR.
HYDRAULIC APPARATUS FOR CONTROLLING FLUID PRESSURE MOTORS.

No. 519,168. Patented May 1, 1894.

WITNESSES: INVENTOR
Claude Bonjour
BY
Howson and Howson
his ATTORNEYS.

(No Model.) 11 Sheets—Sheet 7.

C. BONJOUR.
HYDRAULIC APPARATUS FOR CONTROLLING FLUID PRESSURE MOTORS.

No. 519,168. Patented May 1, 1894.

WITNESSES:
George Baumann

INVENTOR
Claude Bonjour
BY
Howson and Howson
his ATTORNEYS

THE NATIONAL LITHOGRAPHING COMPANY,
WASHINGTON, D. C.

(No Model.) 11 Sheets—Sheet 8.

C. BONJOUR.
HYDRAULIC APPARATUS FOR CONTROLLING FLUID PRESSURE MOTORS.

No. 519,168. Patented May 1, 1894.

WITNESSES:
George Baumann
S. C. Connor

INVENTOR
Claude Bonjour
BY
Howson and Howson
his ATTORNEYS

UNITED STATES PATENT OFFICE.

CLAUDE BONJOUR, OF PARIS, FRANCE.

HYDRAULIC APPARATUS FOR CONTROLLING FLUID-PRESSURE MOTORS.

SPECIFICATION forming part of Letters Patent No. 519,168, dated May 1, 1894.

Application filed July 25, 1893. Serial No. 481,424. (No model.) Patented in France August 14, 1890, No. 207,631; in Italy April 13, 1893, No. 33,776, and in Spain May 5, 1893, No. 14,393.

*To all whom it may concern:*

Be it known that I, CLAUDE BONJOUR, engineer, a citizen of the Republic of France, residing in Paris, France, have invented a Hydraulic Apparatus for Actuating and Controlling the Distributing Devices or Apparatus Connected with Steam or Fluid Pressure Motors, (for which I have obtained a patent in France, dated August 14, 1890, No. 207,631; in Italy, dated April 13, 1893, No. 33,776, and in Spain, dated May 5, 1893, No. 14,393,) of which the following is a specification.

This invention has reference to hydraulic apparatus for actuating and controlling the distributing devices or apparatus connected with steam or fluid pressure motors such as slide piston and other valves or other like mechanism whose movements require to be regulated and timed with the greatest precision the said hydraulic apparatus being capable as hereinafter explained of being located at a distance from the devices or apparatus which it is employed to actuate or control. The distributing valves of steam engines have heretofore been actuated by mechanism forming a direct mechanical connection between the said valves and the driving shaft of the engine. It results from this arrangement notably in marine engines with triple or quadruple expansion that the operation and control of the various steam distributing valves can only be effected by means of a complicated arrangement of mechanism comprising eccentrics, connecting rods, link-motion, guide-rods, weigh shafts and the like which renders the engine difficult of access and greatly increases the cost thereof. In view of the difficulties referred to I dispense with the ordinary mechanical connection between the driving shaft and distributing valves and enable each of such valves and the mechanism immediately connected therewith to be placed in the most convenient position and at the same time greatly simplify this mechanism, especially in the case of multiple cylinder and reversing engines. The hydraulic apparatus hereinafter described and forming the object of this invention enables this result to be attained in a simple and efficient manner.

In order that my said invention may be fully understood I shall now proceed more particularly to describe the same and for that purpose shall refer to the several figures on the annexed sheet of drawings the same letters of reference indicating corresponding parts in all the figures.

Figure 1:
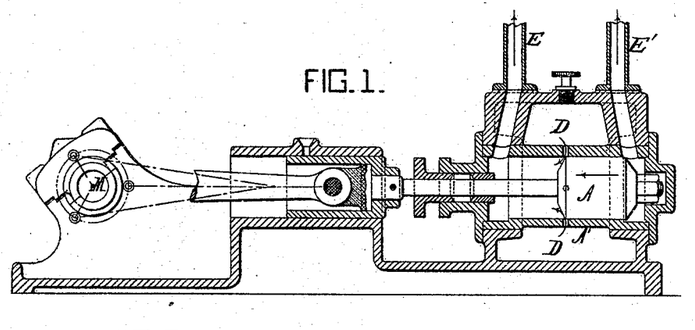
Figure 1 is a vertical section of part of the hydraulic mechanism constructed according to this invention, arranged in a horizontal position.

Hydraulic apparatus according to this invention is constructed with a long generating or motor piston A Fig. 1 working in a cylinder A' being actuated by the driving shaft or other part of the engine. One end of this cylinder communicates with the other by means of pipes and through a pipe E with one end of a cylinder B' Fig. 3 in which works a long piston B. The other end of the cylinder A' is connected through a pipe E' with the other end of the cylinder B'.

The piston A is actuated by the driving shaft M Fig. 1 of the engine either directly or by the aid of mechanism connected with the said shaft and partakes of a movement corresponding with that of the said driving shaft so that it receives from the said shaft a reciprocating motion which it transmits to the piston B by means of the pipes E and E' which are filled with an incompressible liquid. In certain cases the piston A may be actuated by cams or tappets, link motions, combinations of levers or by any other mechanical arrangement capable of transmitting to the said piston A and consequently to the piston B the movements which it is desired to obtain. A number of orifices D communicating with a reservoir not shown in the drawings are provided in the sides of the cylinder A' so as to be uncovered by the piston A as the latter approaches the end of its stroke in either direction and similarly arranged orifices C are provided in the cylinder B'.

The movements of the piston B are so timed and regulated as to cause the slide or other valves of the steam engine to act with precision. For this purpose it is essential that the liquid forming the hydrostatic connection between the pistons should preserve a constant volume whatever may be the differences of density arising from expansion, and whatever may be the volume and the temperature of the liquid in movement through the apparatus. To this end the cylinder A' Fig. 1 in which the piston A works is provided at or near the middle of its length with the series of apertures D which, being uncovered when the piston arrives at the end of its stroke insures the filling of the cylinder. When the piston A performs its stroke in the direction indicated by the arrow Fig. 1, it first forces back the excess of liquid into the reservoir until the apertures D are closed by the piston. When this takes place the liquid remaining in the cylinder is put under pressure and the further motion of the generating or motor piston A is fully transmitted to the driven or receiving piston B, by means of the column of liquid in the pipe E. The piston B is consequently caused to move at exactly the same rate as the piston A, but when it arrives at the end of its stroke it is arranged to uncover the discharging holes C Fig. 3 formed at or near the middle of its cylinder B'. When this takes place the movement of the piston B will cease as the liquid supplied under pressure from the cylinder A escapes into an annular chamber or jacket B$^3$ formed in the wall of the cylinder B' whence it can return through a pipe F to the filling reservoir hereinbefore referred to communicating with the cylinder A'. The piston B now remains stationary until the piston A in its return stroke moving in the opposite direction to that indicated by the arrow again closes the orifices D; when this is effected, corresponding movements of the piston B will take place in the reverse direction and under the same conditions by the action of the column of liquid in the pipe E'. It is evident that with this arrangement of the filling apertures D in the cylinder A' and discharging apertures C in the cylinder B', the volume of the column of liquid remains constant; consequently, the movements of the piston B are rendered perfectly uniform. Moreover, in the case of the application of apparatus to the distribution of motive fluid by means of a link motion or other similar intermediate mechanism, the movements of the piston B can be caused to remain constant within large limits of expansion, for example between fifteen and seventy-five per cent. although the piston A might make different strokes on account of its connection with the actuating or driving mechanism.

Figure 3:
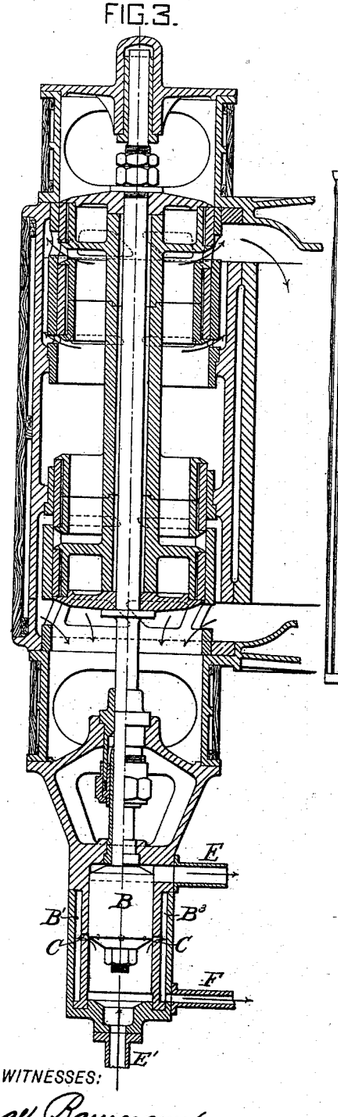
Fig. 3 is a vertical section of another part of the hydraulic mechanism having a hydraulic connection with the first part by means of tubes of any desired length.

The piston B Fig. 3 is double acting, but two single-acting pistons may be used arranged one at each end of the rod to be actuated, the result being the same in each case.

On the axis of the slide valve may be fixed a small rod which passing through a stuffing box to the exterior of the valve chest constantly indicates by its movements before a graduated scale the strokes of the valve and the position of the valve or valves relatively to the ports of the engine cylinder. In certain applications of the apparatus, the liquid forced back by the piston B can be caused to actuate, at a distance therefrom, an apparatus that will serve to indicate all the movements of the said piston B.

As will be obvious hydraulic apparatus of the general type above referred to can be variously modified.

Figure 2:
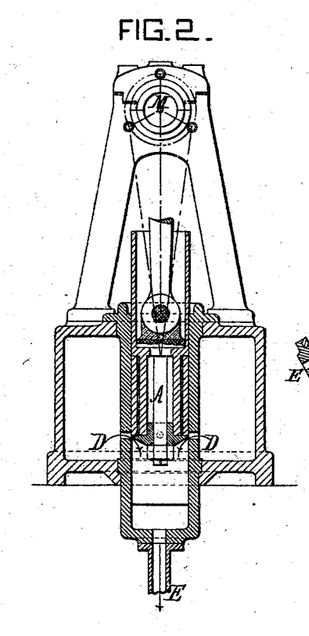
Fig. 2 is a vertical section of this same part arranged in a vertical position.
Figure 4:
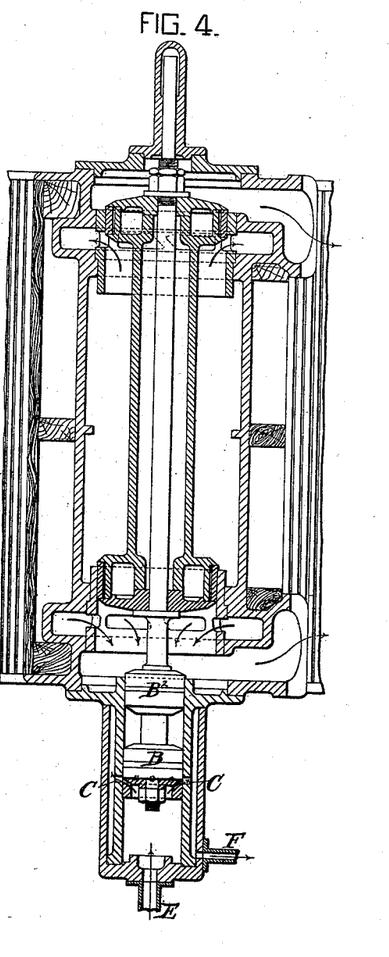
Fig. 4 is a vertical section of a modified construction of the part shown in Fig. 3.

In the modification illustrated in Figs. 2 and 4 the pistons A and B are single acting, and there is only one column of liquid (in the pipe E) between their cylinders. The return movement in this case is produced by a steam actuated piston or by any other suitable arrangement that will insure the return of the piston B; in the example illustrated this return movement is effected by the difference in the two pistons constituting a balanced piston valve actuated by the apparatus. In this modified arrangement a second piston $B^2$ Fig. 4 is placed above the piston B, in order that the steam controlled by the said slide valve may not be in immediate contact with it, but a stuffing box would accomplish the same end; in the case of the application of the apparatus to the operation of flat or oscillating slide-valves, this piston serves to produce the return movement of the piston B. In this modification the functions of the apparatus remain the same as in the typical arrangement first described and all that has hereinbefore been said applies thereto.

Figure 8:
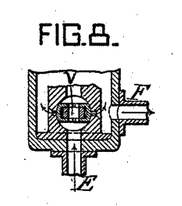
Fig. 8 illustrates in vertical section a valve which is interposed between the aforesaid two parts of the mechanism.

To insure the rapid return of the slide valve and to obtain an instantaneous closing of the admission port of the engine cylinder a valve V Fig. 8 may advantageously be placed between the pistons A and B. The object of this valve is to break the connection between the two pistons by allowing the liquid under pressure to escape into the annular space. This valve is actuated by mechanism controlled by the governor and is capable of producing the aforesaid result at any period of the stroke of the moter piston the said period being determined by the action of the governor. The valve V is especially applicable to the control of the admission valves of motive fluid engines having four distributing valves with rapid cut off.

In certain cases, the piston A can be omitted and the liquid under pressure be supplied from a suitable reservoir which may be supplied by the action of the engine.

Figures 5, 6, 7, 11:
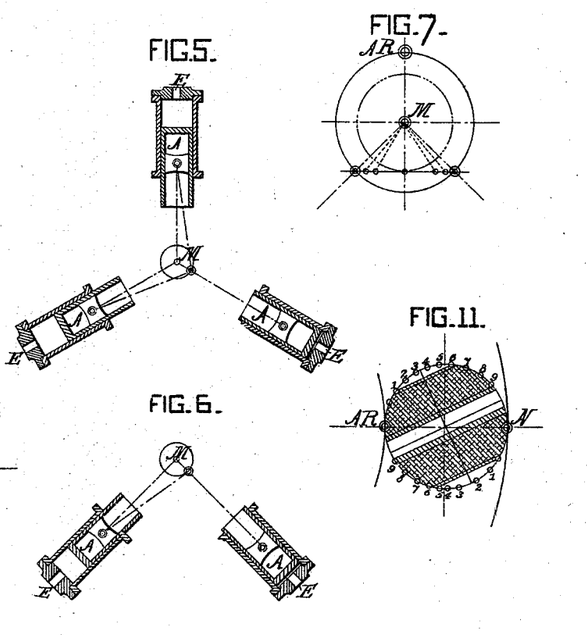
Figs. 5 and 6 represent arrangements of the first part of the hydraulic mechanism for triple and double expansion respectively.
Fig. 7 is a diagram illustrative of the action of the eccentric employed for reversing engines.
Fig. 11 is a diagram illustrating the action as hereinafter explained.

Several motor pistons A can be worked by the same eccentric keyed on the driving shaft M as indicated in Figs. 5 and 6 so that in the case of the application of the above described apparatus to reversing engines, the reversal as well as the expansion can be obtained by simply displacing the one eccentric keyed upon the shaft M, this displacement taking place parallel to a line joining the centers of the eccentrics see diagram Fig. 8 in which AV corresponds with forward gear and AR corresponds with backward gear.

Figure 9:
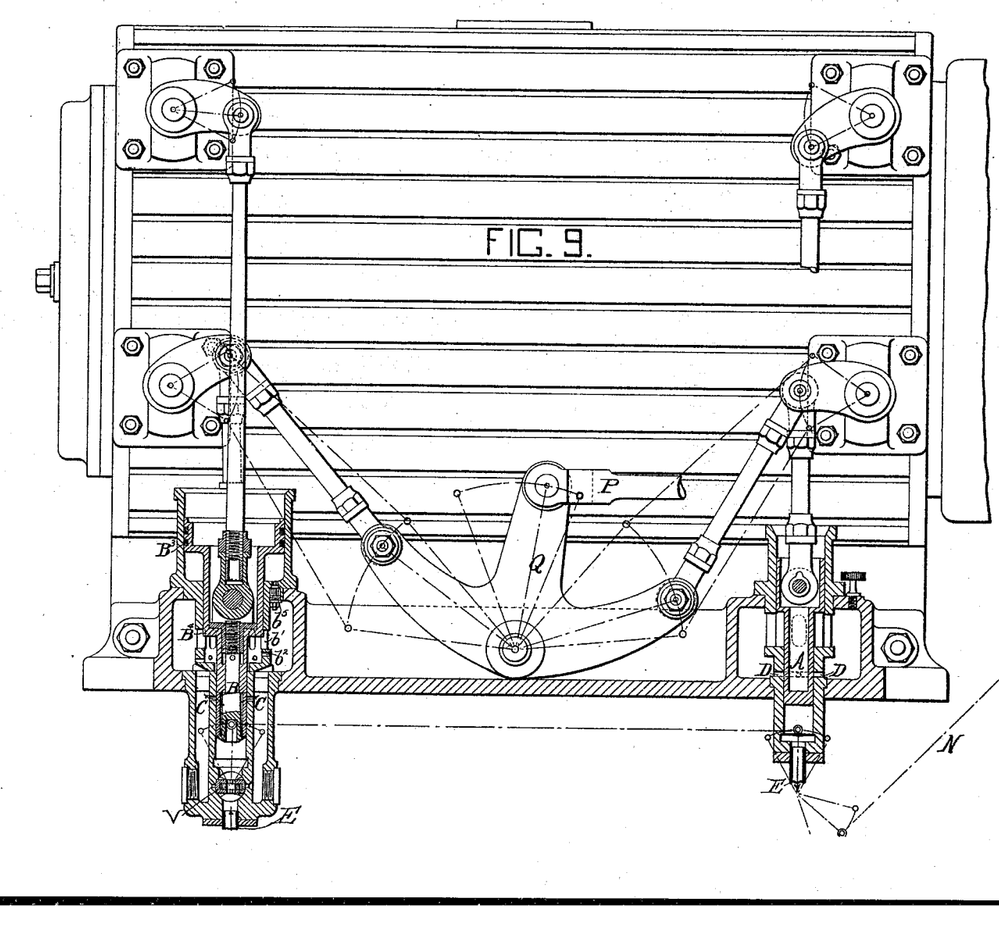
Figs. 9 and 10 illustrate in front and side elevation respectively (partly in section), the arrangement of the hydraulic mechanism as constructed for working the admission valves of a steam engine constructed with four distribution valves arranged for variable expansion and rapid cut off.
Figures 10, 14:
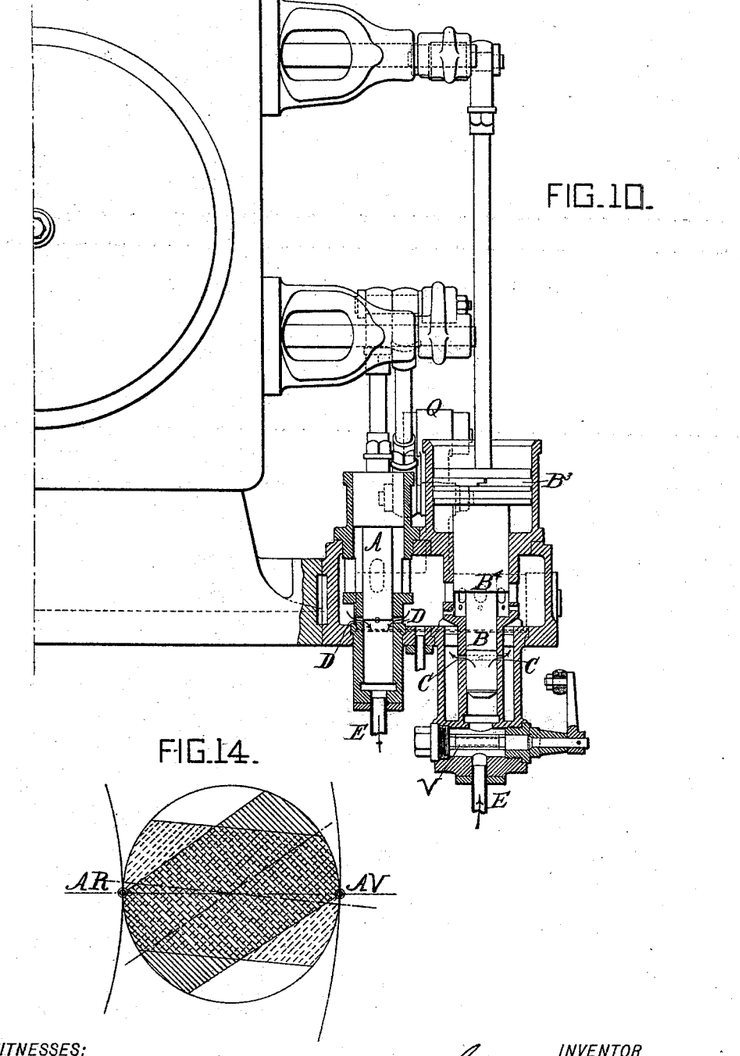
Figs. 14 to 18 are diagrams illustrating the distribution of the movements of the slide valves.

In another arrangement the pistons A and B instead of being arranged at a distance apart are arranged near to each other as represented in Figs. 9 and 10. In this arrangement which is employed with engines having four distributing valves, the cylinders containing the said pistons are arranged in a single casing and are connected by a pipe E in such a manner that the movements of the one will be wholly transmitted to the other. The cylinder containing the piston B is provided at its lower part with an outlet or controlling valve V operated by the governor through a rod at N. The piston B in this particular case, may be combined with two other pistons $B^3$ and $B^4$ placed immediately above it the piston $B^4$ operating as a buffer to deaden the shocks produced at the time of the rapid return of the different moving parts, and the piston $B^3$ forming an atmospheric spring and serving to return the admission valve to the closed position. The cylinder containing the buffer piston $B^4$ is, for this purpose, perforated with a series of large holes $b'$ and with a second series of holes $b^2$ of gradually decreasing size arranged to be progressively covered while the admission valve is being closed. In the lower end of the cylinder containing the atmospheric piston $B^3$ is a valve $b^5$ for the escape of the air or of the liquid which may have entered the said cylinder.

Figure 19:
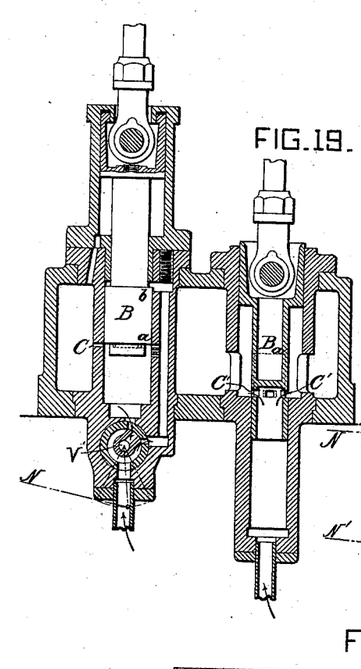
Fig. 19 illustrates in section the arrangement of the second part of the hydraulic mechanism constructed for working in combination with engines having four distribution valves actuated by generating pumps as hereinafter described.
Figure 20:
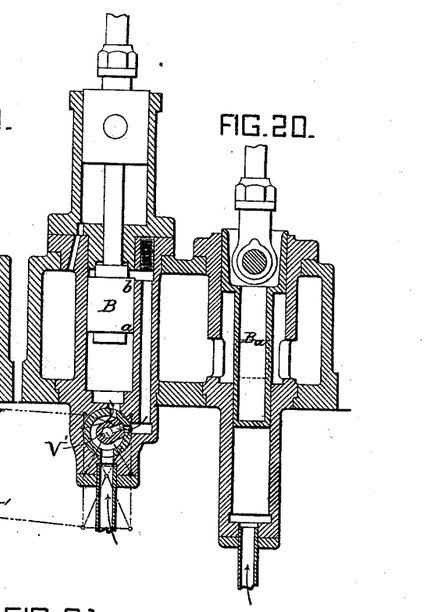
Fig. 20 similarly illustrates this mechanism as arranged for engines with four distribution valves actuated by accumulators.

In another arrangement instead of uniting or combining the pistons A and B in the manner described with reference to Figs. 9 and 10 the piston A is independent, and within a single casing are arranged two cylinders containing two pistons B $B^a$ Fig. 12 the piston B being arranged in the same way as the piston B described with reference to Figs. 9 and 10 and serving to work the admission valves; the piston $B^a$ being of simple construction and serving to work the admission valve or the exhaust valve. As a modification of the same principle the pistons B and $B^a$ may be arranged as represented in Figs. 19 and 20. According to this arrangement the piston B has its two ends $a$ and $b$ made of unequal area in order to obtain a more rapid cut off. The lower end of its cylinder is provided with a distributing and relief valve V' (hereinafter referred to as the controlling valve) which at the required times admit liquid under pressure supplied by a pump or by an accumulator either to the upper or to the lower side of the piston B so as to thereby cause at accurately regulated periods the opening or the closing of the admission valve of the engine. The duration of the admission period is always proportional to the power required of the engine, the said controlling valve V' being actuated by a rod at N the movements of which are controlled by the governor.

In the arrangement illustrated in Fig. 19 which is applicable to an engine having four distributing valves and is actuated by generating or force pumps, the piston B with unequal or differential areas of the end surfaces is arranged to work in a cylinder formed with a series of discharging apertures C at or near the middle, and the piston $B^a$, in the form of a plunger, is hollow or tubular being open at one end and formed with discharging apertures C' that are uncovered at a certain position of the piston or plunger so that liquid can then escape through them and through apertures C formed in the sides of the cylinder.

In the modified arrangement illustrated in Fig. 20 adapted to be actuated by an accumulator, the discharge apertures C are omitted and the controlling valve V' is operated by a triply jointed lever arrangement actuated by connecting rods N and N' attached to the end joints. One of these end joints is connected with permanently adjusted eccentric mechanism, which actuates the slide valve for producing the compression, lead and opening at fixed precise and determined periods; the other end joint is connected with an adjustable eccentric mechanism controlled by the governor, and serves to produce in accordance with the power required of the engine, the cut off at periods determined by the action of the governor.

Figure 21:
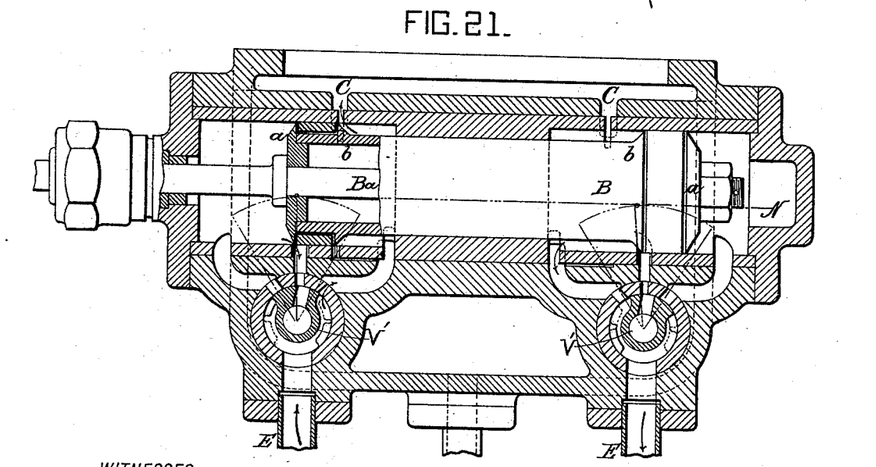
Fig. 21 illustrates the arrangement of the second part of the hydraulic mechanism as arranged for engines having only one distribution valve with variable expansion and cut off.

The piston B provided with the differential end surfaces $a$ and $b$ and the controlling valve V' may be arranged according to the modification illustrated in Fig. 21. This modification is designed for controlling the distribution of steam in an engine provided with a single distributing valve or with two coupled reciprocating distributing valves having a rapid cut off movement. It is to be noted that the stroke of the slide valve is divided into two periods: First, the piston B, by the pressure of liquid upon the end $a$ is put in motion at determined and fixed times, calculated so as to obtain the compression, the lead and the opening under the most favorable conditions; and secondly, the said piston B by the pressure of liquid upon its annular surface $b$ is actuated at periods controlled by the governor, so as to insure the rapid cut off of the steam at the admission valve, the latter result being due to the difference in the areas of the two end surface $a$ and $b$ of the piston B. Thus it will be understood that the delivery of the generating pump or motor piston remaining the same, the speed of the driven or receiving piston B must be proportional to the difference in the area of the two ends $a$ and $b$ of the latter. The period of repose during the stroke of the engine, is provided for first by the position of the discharge aperture formed in the wall of the cylinder and controlled by the piston B; and secondly by the disposition of the small controlling valve V' which prevents the passage of the liquid and arrests the piston B until the desired time.

Figure 22:
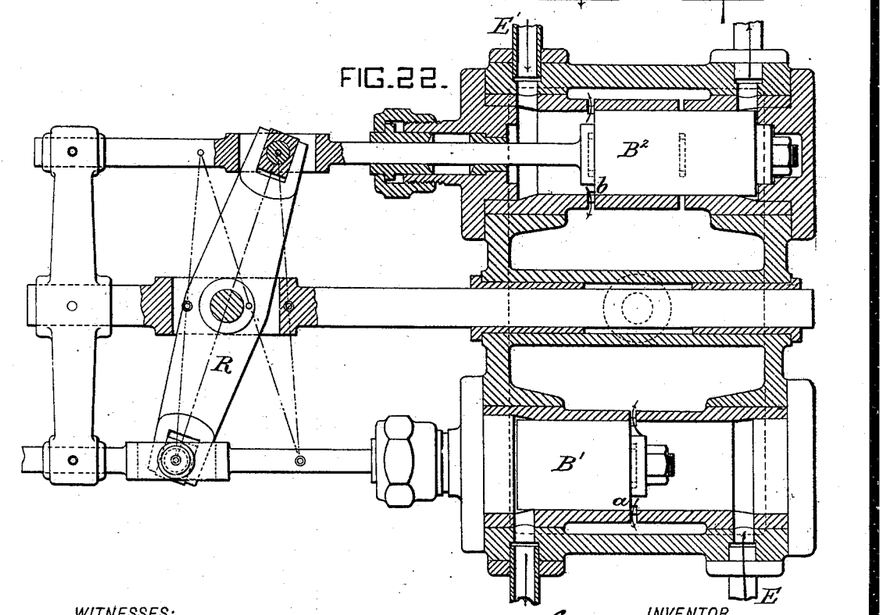
Fig. 22 illustrates a modified arrangement of the mechanism illustrated in Fig. 21.

Instead of providing one piston B with the two differential surfaces $a$ and $b$, the latter may belong to two separate pistons B' and B² Fig. 22. In this modification the piston B' having its acting surface at $a$ will serve for effecting the compressions, leads, and openings, while the piston B² having its acting surface at $b$ serves for effecting the rapid cut off. When the said end surfaces $a$ and $b$ are of practically equal area (as represented in Fig. 22) a rapid cut off can be obtained by a difference in the supply from each of the generating or motor pumps. In this arrangement the controlling valves V' are dispensed with but the required variation in the duration of admission is obtained by varying by means of mechanism controlled by the engine governor, the angle or position of the eccentric that actuates the piston of the large generating or motor pump, employed for imparting motion to the piston B² and producing the rapid cut off. The two pistons B' and B² are connected to the extremities of a beam or rocking lever R to the middle of which is attached the connecting rod of the slide valve to be operated. The slide valve is consequently stopped at variable and determined times, the action of the mechanism for changing the angle of the eccentric that influences the motion of the cut-off piston B² being regulated by the governor.

Figure 23:
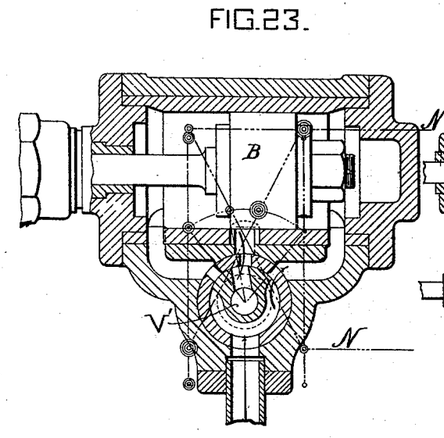
Fig. 23 illustrates in section the second part of the hydraulic mechanism as arranged for a steam engine having only one slide valve actuated by an accumulator.

In the modification shown in Fig. 23, the cylinder of the piston B is not provided with the usual discharge aperture C such as hereinbefore described and the controlling valve V' for such piston is put in motion by a triply jointed lever the extremities of which are actuated by connecting rods N and N' in the manner hereinbefore described with reference to Fig. 22. This lever occupies successively four different positions represented in Fig. 23. The first position is indicated by one circle drawn round the center of each joint, the second position being represented by two circles, the third by three and the fourth by four circles.

As in one of the modifications hereinbefore referred to with reference to Fig. 21 the wall of the cylinder containing the piston B is formed with an aperture governed by the controlling valve V' so as to provide for the arrest and liberation at the required times of the piston B actuating the slide valve of an engine provided with a single slide valve.

Figure 24:
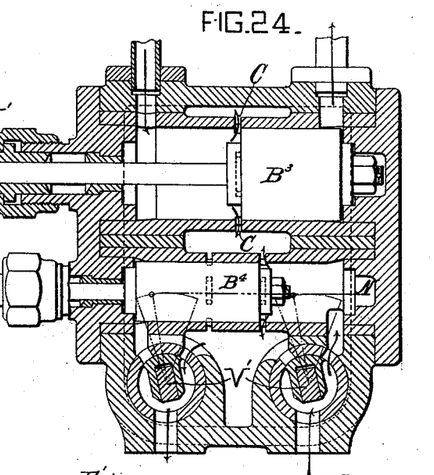
Fig. 24 illustrates in section the arrangement of this part of the mechanism when applied to an engine having two superposed slide valves.

In another modification illustrated in Fig. 24 designed more especially for controlling the distribution of steam in an engine provided with two superposed slide-valves, there are two pistons one of which B³ actuates the principal slide valve of the engine while the other B⁴ actuates the cut off or expansion valve. These two pistons, which take the place of the single piston B of the typical arrangement, first herein referred to, are put in motion by two generating pumps similar to those represented in Fig. 13 which are independent of each other and are worked by eccentrics keyed on the driving shaft M of the engine. The movements of the piston B³ are insured at precise and determined times, by the filling apertures of the generating pump or motor piston A and by the discharging-apertures C of the receiving cylinder. The movements of the piston B⁴, which depend upon the respective positions of two controlling valves V' operated by a connecting rod N take place at variable periods. The said connecting rod N which is in connection with mechanism the movement of which is controlled by the governor, produces the cut-off at times determined by the said governor and in accordance with the work required to be done by the engine.

Figure 12:
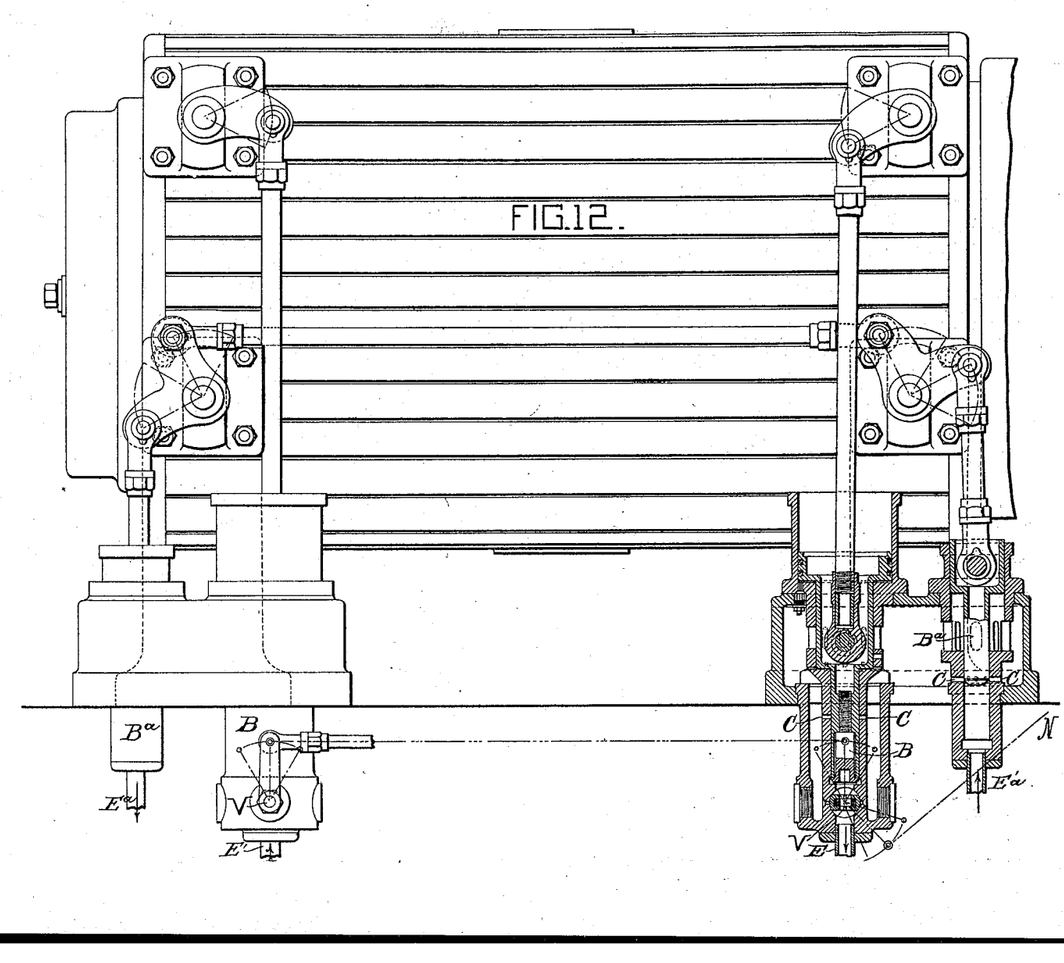
Fig. 12 represents in front elevation, partly in section, the arrangement of the second part of the hydraulic mechanism as constructed for working the admission valves and the exhaust valves of an engine provided with four distribution valves.

The arrangements illustrated by way of example in Figs. 9, 10 and 12 are applicable to a steam engine provided with four distribution valves. In the construction of this apparatus the pistons A and B may be directly attached to the base plate of the engine cylinder according to the arrangement illustrated in Figs. 9 and 10 or according to that indicated by Figs. 12 and 13.

In the arrangement illustrated in Figs. 9 and 10 the connecting rod P in connection with any suitable eccentric mechanism fixed on the driving shaft, transmits an oscillating motion to a three armed lever Q which actuates the two exhaust valves by means of adjustable connecting-rods the spindles of the said valves being provided with levers to which are jointed connecting rods for actuating the pistons A of the hydraulic apparatus. The cylinders containing these motor pistons A are connected with the cylinders containing the driven or receiving pistons B, by pipes E so that the motion of the first is transmitted to the second which actuate by coupling rods, the admission valves of the engine. The controlling valves V are connected by a coupling rod and are actuated through a connecting rod N, by mechanism with means for changing the angle of the eccentric controlled by the engine governor. Under these conditions, the action of the pistons A and the consequent rapid closing of each admission port can take place at any period of the stroke of the engine piston, this period being determined by the action of the governor, which thus always regulates the duration of the admission in accordance with the pressure of the steam and with the power required of the engine.

Figure 13:
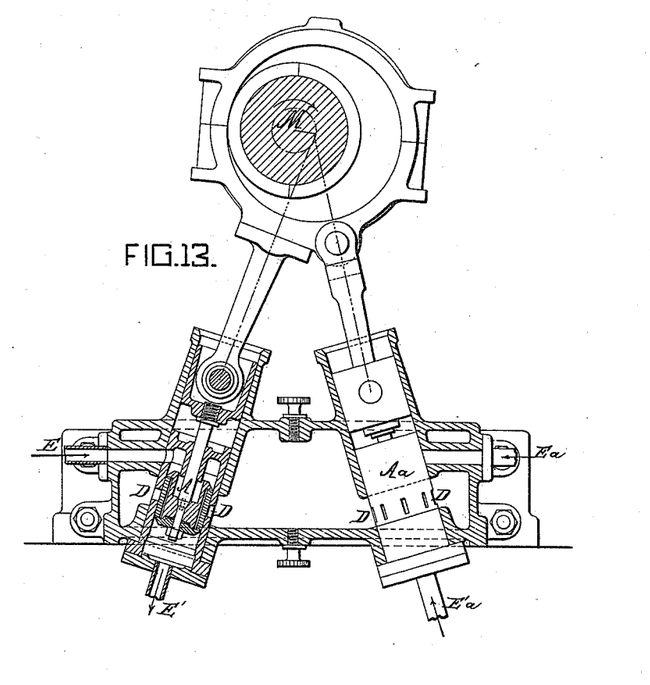
Fig. 13 illustrates in vertical section the arrangement of the first part or generating or supply pumps employed in combination with the arrangement illustrated in Fig. 12.
Figure 15:
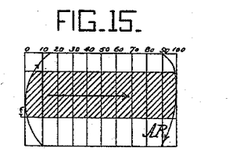
Figure 16:
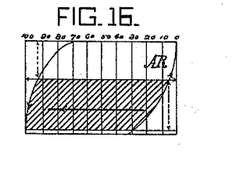
Figure 17:
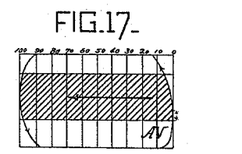
Figure 18:
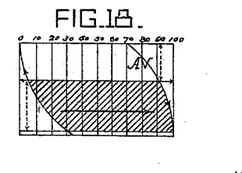

In the arrangement illustrated in Figs. 12 and 13, mechanism which serves for transmitting to the exhaust valves the movements of an eccentric are omitted and the pumps or motor pistons A $A^a$ are actuated directly by an eccentric keyed on the driving shaft $M^{13}$ Fig. 13 as hereinbefore stated. The cylinder of the pistons A is connected by pipes E E' with the cylinders B working the admission valves while the cylinder of the other piston $A^a$ is connected by the pipes $E^a$ $E'^a$ with the cylinders $B^a$ actuating the exhaust valves. The cylinders B are constructed in the same manner as has been described for the preceding application, while the others $B^a$ are of simple construction. The controlling valves V employed in this arrangement are actuated in the manner hereinbefore indicated.

The diagrams Figs. 15, 16, 17 and 18 show that a period during which the movements of the valves are absolutely suspended is obtained by means of the orifices D in the force or motor pumps and the orifices C in the receiving cylinders. This result is of great importance especially in connection with the exhaust valves which are consequently not set in motion until the pressure to which they are exposed is at a minimum. Moreover the movements being extremely rapid the opening and closing of the orifices in the cylinder are caused to take place under the most favorable conditions possible. Moreover all the movements take place with great smoothness provided that the forcing pistons A gradually close the orifices D which enables any distributing device of any type whatever to be moved with rapidity. Assuming for example that the forcing or motor piston (A) is actuated by a rotary eccentric motion it results that according to the length of the orifices D relatively to the radius of the eccentricity the devices to be actuated receive motion during a corresponding fraction of the circle described by the crank. In like manner whatever may be the reduction of the angle during which the action takes place the parts are set in motion without any shock the liquid by which they are moved being subjected to a gradually increasing pressure owing to the gradual closing of the orifices D.

Figure 25A:
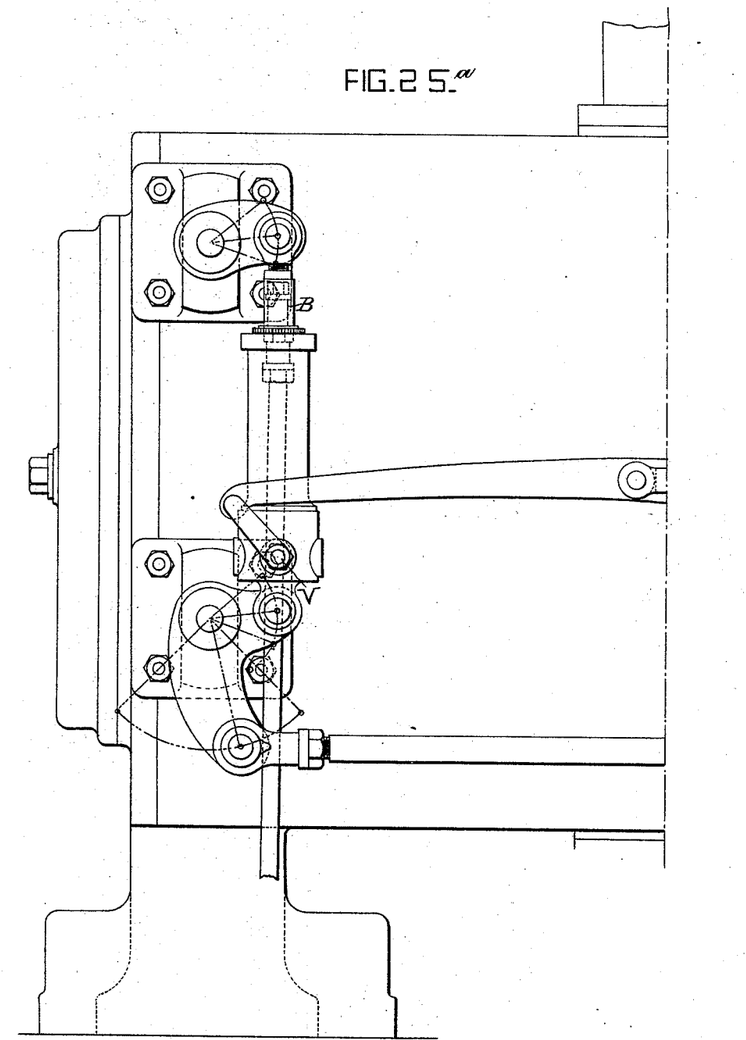
Fig. 25 (drawn on two sheets, the right hand end being numbered 25$^a$ and the left hand end 25$^b$) and Fig. 26 illustrate in front elevation, partly in section and in end elevation respectively, the arrangement of the hydraulic mechanism in the form of a connecting rod applied to an engine having four distribution valves.
Figure 25B:
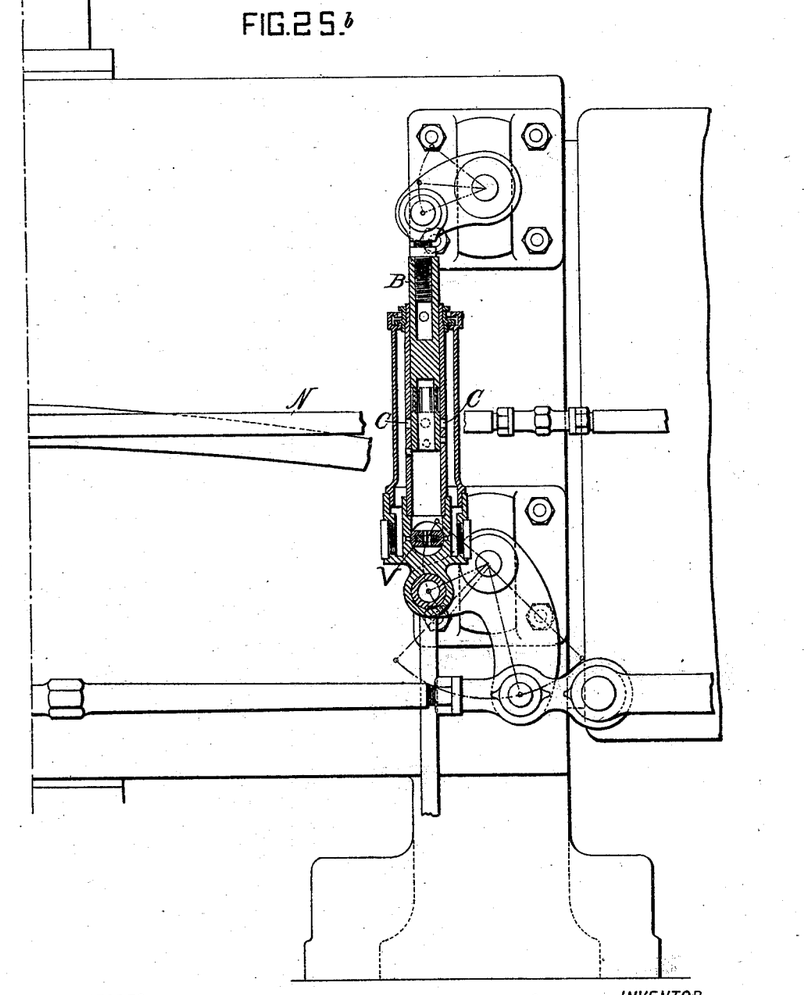
Figure 26:
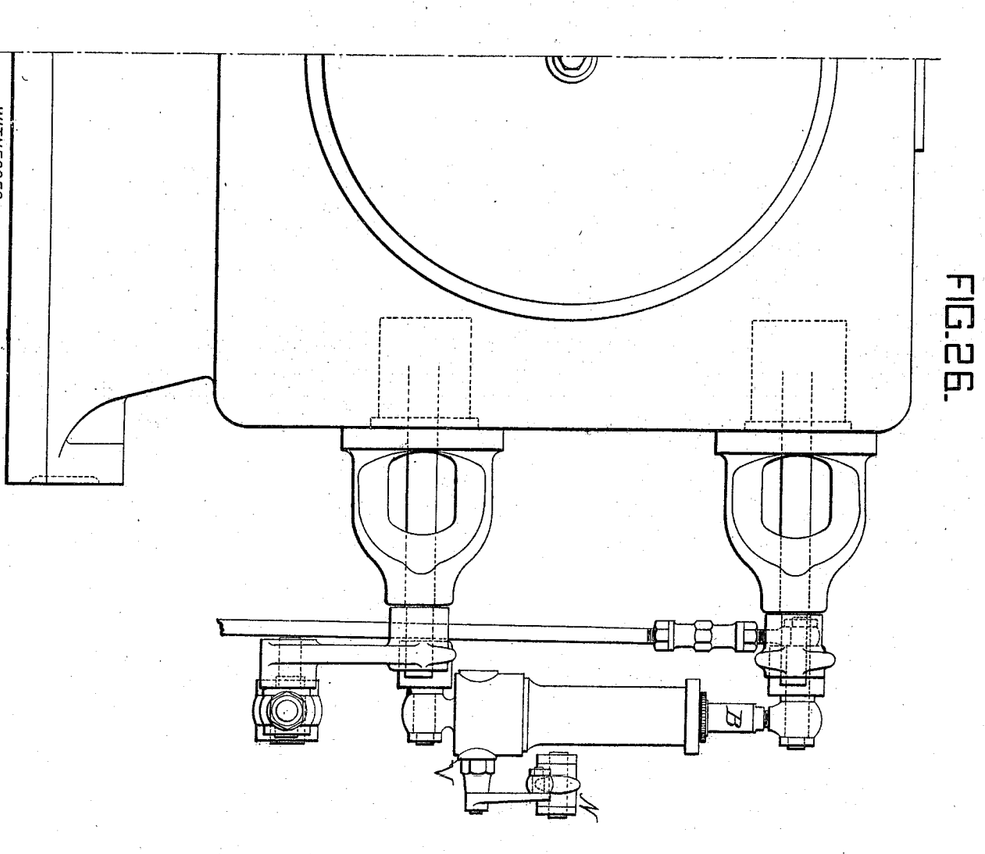

In another arrangement as applied to an engine having four distributing valves, each hydraulic apparatus is in the form of a connecting rod as represented in Figs. 25 and 26. In this case each piston B is jointed by its rod to a lever arm fixed on the spindle of the admission valve and its cylinder which is provided with discharging apertures C and with a controlling valve V, is jointed at its lower part to one arm of a lever that is fixed on the spindle of the exhaust valve and the other arm of which is connected with and driven from the driving shaft of the engine by means of a rigid rod actuated by an eccentric keyed on the said shaft. Each controlling valve V by means of which the rapid cut off action of the corresponding admission valve is effected, is connected by a rod N to actuating mechanism controlled by the engine governor as before.

In order that the working of the apparatus may take place without shock, the cylinder of each piston B is or may be provided in addition to the discharging hole or holes C with another series of holes that are made smaller than the first and are arranged in steps whereby the actuation of the piston B can be effected progressively and without shock. The cylinder of the piston B is provided with a casing into which open both the discharging holes and the passages leading to the controlling valve.

I claim as my invention—

1. In a hydraulic apparatus for actuating from a distance distribution devices or other mechanism, the combination of two cylinders, in communication with each other, each of the cylinders being provided with a piston, one of the said pistons being actuated by the motor shaft, means whereby the first piston actuates the other during only a portion of its stroke, the other piston being connected to the device to be actuated, and means for maintaining a constant volume of incompressible fluid between the two pistons while one is actuating the other, substantially as described.

2. In a hydraulic apparatus for actuating from a distance distribution devices or other mechanism, the combination of two cylinders in communication with each other, each of the cylinders being provided with a piston, one of the said pistons being actuated by the motor shaft and adapted to actuate the other piston during a portion of its stroke, and the other piston being connected to the device to be actuated, with a reservoir for an incompressible fluid and orifices in both cylinders communicating with the reservoir, all substantially as and for the purposes set forth.

3. In a hydraulic apparatus for actuating from a distance distribution devices or other mechanism, the combination of two cylinders in communication with each other, and adapted to contain an incompressible fluid, each of the cylinders being provided with a piston, one of the pistons being actuated by the motor shaft and adapted to actuate the other piston during a portion of its stroke and the other piston being connected to the device to be actuated, with a valve between the two pistons and adapted to be controlled by the governor, all substantially as and for the purposes set forth.

4. In a hydraulic apparatus for actuating distributing devices or other mechanism, the combination of a cylinder A′ provided with a piston A actuated by the motor shaft, a reservoir for an incompressible fluid, and orifices D connecting the cylinder A′ with the reservoir, with a cylinder B′ provided with a piston B connected to the device to be actuated, and also provided with escape orifices C communicating with the said reservoir, and pipes E E′ connecting the two ends of the cylinder A′ with the two ends of the cylinder B′, the said orifices D and C being so arranged as to cause the movements of the piston B and the device connected thereto, to be suspended during certain periods, all substantially as set forth.

5. The combination of a motor with a hydraulic apparatus for actuating the distribution devices, comprising one or more cylinders A′ each provided with a piston connected to the crank shaft, one or more cylinders B′ each in communication with one of the cylinders A′ and each provided with a piston adapted to be actuated by the first said piston during a portion of the first piston's motion, each of the said pistons in the cylinders B being connected to a device to be actuated, a reservoir for an incompressible fluid and orifices in all of the cylinders communicating with the reservoir, all substantially as and for the purposes set forth.

6. In a hydraulic apparatus for actuating distribution devices or other mechanism, the combination of a reservoir for an incompressible fluid, a cylinder having orifices communicating with the said reservoir, and provided with a piston actuated by the crank shaft, with a second cylinder communicating with the first cylinder, and provided with a piston connected to the admission valve, and also provided with two sets of orifices leading to the reservoir one set being of gradually decreasing size adapted to be progressively closed by a part of the piston as the admission valve is being closed, all substantially as and for the purposes set forth.

7. In a motor, the combination of a reservoir for an incompressible fluid, a cylinder having orifices communicating with the reservoir, and provided with a piston, lever arms connecting the said piston with the exhaust valve and means for actuating the lever arms, with a second cylinder provided with orifices communicating with the reservoir and also provided with a piston connected to the admission valve and having buffer and atmospheric springs, and a pipe connecting the two cylinders and provided with a valve controlled by the governor, all substantially as and for the purposes set forth.

8. In a motor, the combination of a reservoir for an incompressible fluid, two cylinders communicating with the reservoir and provided with pistons connected to the crank shaft, and a second set of two cylinders each communicating with the reservoir and each in communication with one of the first mentioned cylinders, one of the second set of cylinders being provided with a piston connected to the exhaust valves, and the other provided with a piston connected to the admission valve and having buffer and atmospheric springs, all substantially as set forth.

9. In a motor the combination of a reservoir for an incompressible fluid, two cylinders communicating with the reservoir and provided with pistons connected to the crank shaft, and a second set of two cylinders each communicating with the reservoir and each in communication with one of the first mentioned cylinders, one of the second set of cylinders being provided with a piston connected to the exhaust valve, and the other being provided with a valve controlled by the governor and with a piston having differential areas and connected to the admission valve, all substantially as and for the purposes set forth.

10. In a motor the combination of a reservoir for an incompressible fluid, a cylinder provided with a piston actuated by the crank shaft, and also provided with orifices communicating with the reservoir with a second cylinder provided with orifices communicating with the reservoir and also provided with a piston connected to the distribution devices and a passage leading from the first cylinder and branching to each end of the second cylinder, the piston in the second cylinder presenting differential areas to the opposite ends, and a valve controlled by the governor at the branching in the said passage, all substantially as and for the purposes set forth.

11. In a motor, the combination of two motor pumps actuated by the driving shaft and of different capacities, the smaller having a fixed adjustment and the larger a variable adjustment, with two cylinders each connected to one of the said pumps, pistons and piston rods for each cylinder and a cross arm connecting the two piston rods and having connected thereto at its center the connecting rod of the slide valve, all substantially as and for the purposes set forth.

In testimony whereof I have signed my name to this specification in the presence of two subscribing witnesses.

CLAUDE BONJOUR.

Witnesses:
　LÉON FRANCKEN,
　ROBT. M. HOOPER.